United States Patent [19]

Tessier et al.

[11] Patent Number: 5,073,694
[45] Date of Patent: Dec. 17, 1991

[54] METHOD AND APPARATUS FOR LASER CUTTING A HOLLOW METAL WORKPIECE

[75] Inventors: Jeff M. Tessier; Woodward G. Brown, both of Monument, Colo.

[73] Assignee: Synthes (U.S.A.), Paoli, Pa.

[21] Appl. No.: 658,551

[22] Filed: Feb. 21, 1991

[51] Int. Cl.$^5$ .............................................. B23K 26/00
[52] U.S. Cl. ............................. 219/121.7; 219/121.71; 219/121.82; 219/121.84
[58] Field of Search ...................... 219/121.71, 121.72, 219/121.82, 121.84

[56] References Cited

U.S. PATENT DOCUMENTS

| | | | |
|---|---|---|---|
| 1,812,409 | 9/1929 | Leckie | 219/61.12 |
| 2,189,331 | 12/1938 | Sower | 219/61.12 |
| 2,189,339 | 2/1939 | Black et al. | 219/61.12 |
| 2,947,065 | 2/1953 | Moody et al. | 29/155.57 |
| 4,742,206 | 5/1988 | Dietterich et al. | 219/121.67 |
| 4,893,972 | 1/1990 | Blaho | 409/299 |

*Primary Examiner*—C. L. Albritton
*Attorney, Agent, or Firm*—Davis Hoxie Faithfull & Hapgood

[57] ABSTRACT

A method and apparatus for the laser cutting of hollow metal workpieces to minimize or eliminate residue or dross adherence to the inner circumference of the workpiece is disclosed. Coolant is pumped through the apparatus to contact the inner portion of the workpiece before and during laser cutting. The dross which forms during cutting drops into the coolant, solidifies and is flushed out of the workpiece along with the coolant. The coolant and dross are then collected by a trough, which funnels them to the coolant tank where the dross is removed by a filter and the coolant recycled. In a preferred embodiment, a microprocessor controls the laser cutting and coolant flow operations.

16 Claims, 4 Drawing Sheets

DETAIL B

METHOD AND APPARATUS FOR LASER CUTTING A HOLLOW METAL WORKPIECE

FIELD OF THE INVENTION

The present invention relates generally to an improved laser cutting process and apparatus for precision cutting a hollow metal workpiece to minimize or eliminate residue adherence to the inner wall of the workpiece. Minimizing or eliminating residue or dross adherence is especially important for applications such as the laser cutting of stainless steel internal fixation devices.

DESCRIPTION OF THE PRIOR ART

Various methods of collecting and congealing particles of molten metal which pass into the interior of metal articles in the field of tube welding are known. See, e.g., U.S. Pat. Nos. 1,812,409, 2,189,331 and 2,189,339.

U.S. Pat. No. 4,893,972 describes a cutting tool for removing upset, deposited after welding, from inside a metal tube without forcing splatter onto the inner surface of the tube. An upset removal station contacts the inner surface of the tube to remove the upset, while a fluid is introduced in a radial direction toward the inner surface of the tube and upstream of a roller means. The fluid forms a barrier to minimize splatter from being rolled onto the inside surface of the tube by the downstream roller.

One attempt to minimize residue adherence when laser cutting involved coating the metal workpiece with solutions such as boron nitrate or penetrating oil to make the surface nonadhesive. This attempt was not entirely successful because some residue still adhered to the workpiece, requiring post process removal.

Another method requires baking an epoxy material onto the inside surface of the tube, or packing other sacrificial materials such as foil, plastic tubing, or wax inside the tube. During laser cutting, the molten residue embeds itself or adheres to the added material, which later is removed and discarded. This method has proven to be expensive and time consuming.

SUMMARY OF THE PRESENT INVENTION

The present invention provides an inexpensive method and apparatus to minimize or eliminate dross adherence to the inner circumference of a hollow metal workpiece, such as a tube, when laser cutting through a wall of the workpiece. Advantages include residue removal and tube cooling as cutting is performed, the latter permitting safe handling soon after processing.

A presently preferred embodiment includes a rotary table apparatus and a distal tail apparatus attached to a machine table. A metal tube is held longitudinally under light pressure between the rotary table apparatus and the distal tail apparatus. A coolant tank and associated pump located below the machine table are connected by a hose to the rotary table apparatus. A cutting laser, preferably under microprocessor control, is positioned over the tube workpiece. Lastly, a trough or tank to accumulate and recycle coolant is positioned under the machine table.

In one application utilizing the present device and method, a predetermined pattern is cut through one wall of a stainless steel tube implantation device. The pattern dimensions, laser positioning requirements, and other pertinent information are programmed into a microprocessor which controls all aspects of the process. The laser is controlled to move in the x, y and z planes, and the rotary table apparatus to rotate the tube as needed to cut the desired pattern. Before and during cutting, the apparatus pumps coolant through the tube. The coolant, primarily comprised of water, flows through the apparatus and contacts the inner circumference of the tube. The laser heats the tube metal as it cuts, causing molten stainless steel residue or dross to drop into the flowing coolant. The dross solidifies upon contact with the coolant and is flushed out thereby. The coolant and dross exit the tube onto the machine table and are collected by the trough or tank. The dross is then filtered out and the coolant recycled to the pump. The present invention thus minimizes or eliminates dross adherence to the inner circumference of the tube.

A further advantage of the present invention is its ability to cool the workpiece as cutting progresses. An operator can now handle the workpiece soon after cutting is completed without donning protective clothing.

The method and apparatus of the present invention finds particular application in the field of laser cutting of stainless steel internal fixation devices, and could possibly be applied when laser cutting hollow steel turbine blades. Since internal fixation devices are surgically implanted into humans, care must be taken to insure that these devices are free of foreign matter which could dislodge after implantation and cause internal tissue damage. Likewise, the hollow turbine blades used in 3et engines must be free of foreign matter which could dislodge while the engine is operating.

Additional details, features and advantages of the present invention are clear from the drawings, and from the detailed discussion below.

Figure 2A:
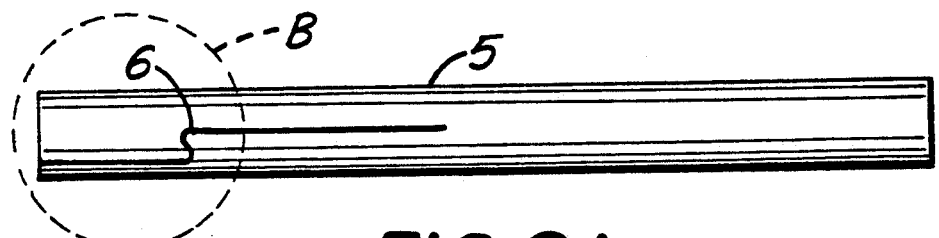
FIGS. 2A and 2B depict a side view and an end view, respectively, of a stainless steel tube of a type which could be cut using the method and apparatus of the present invention.
Figure 2B:
Figure 2C:
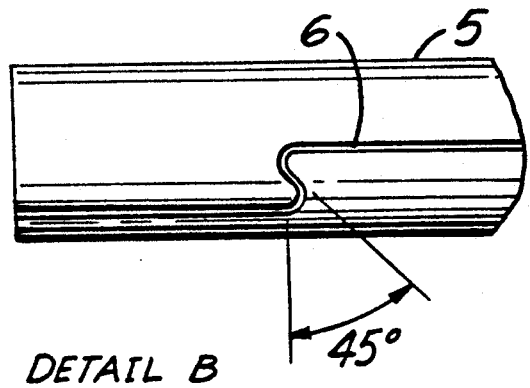
Figure 3B:
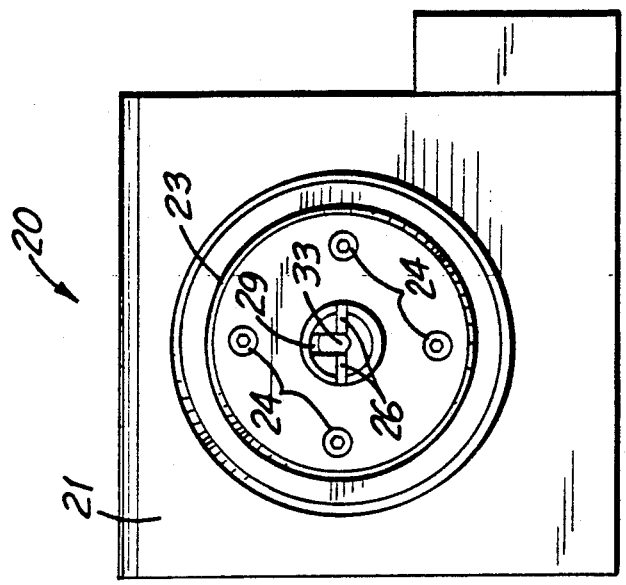
Figure 3A:
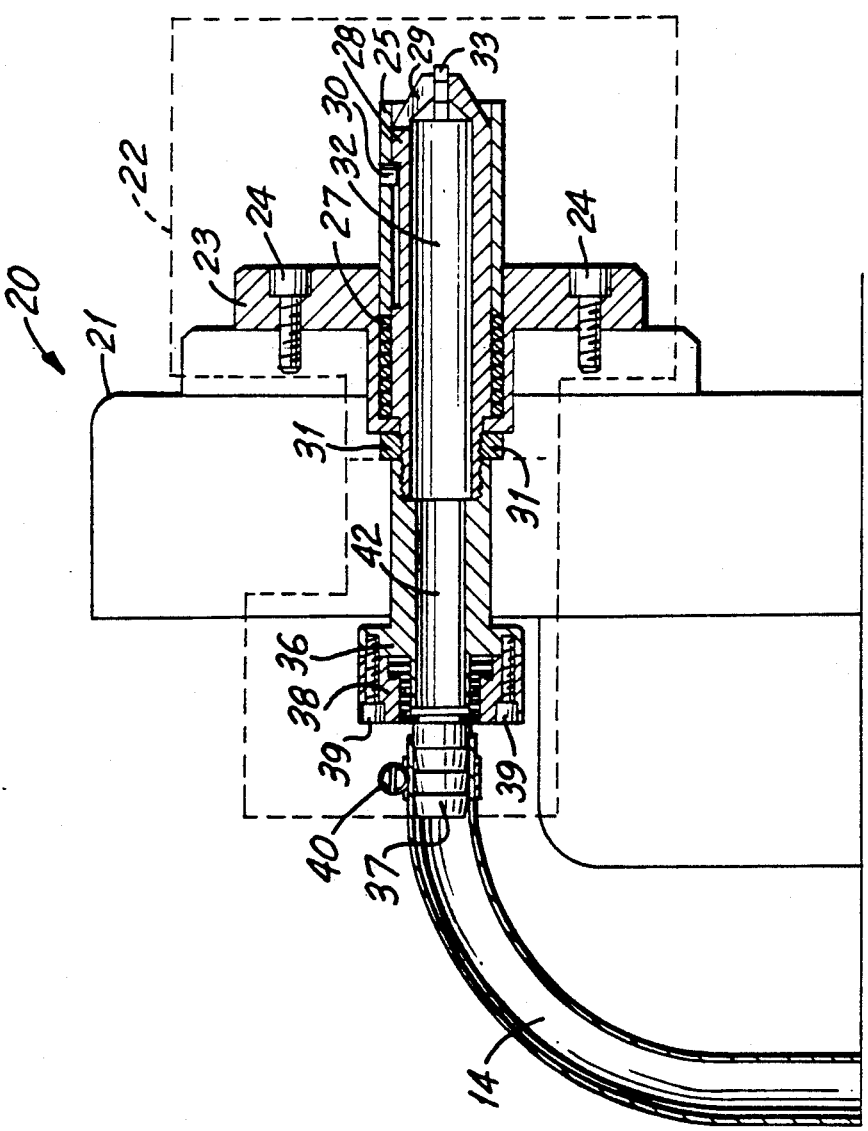
Figure 4B:
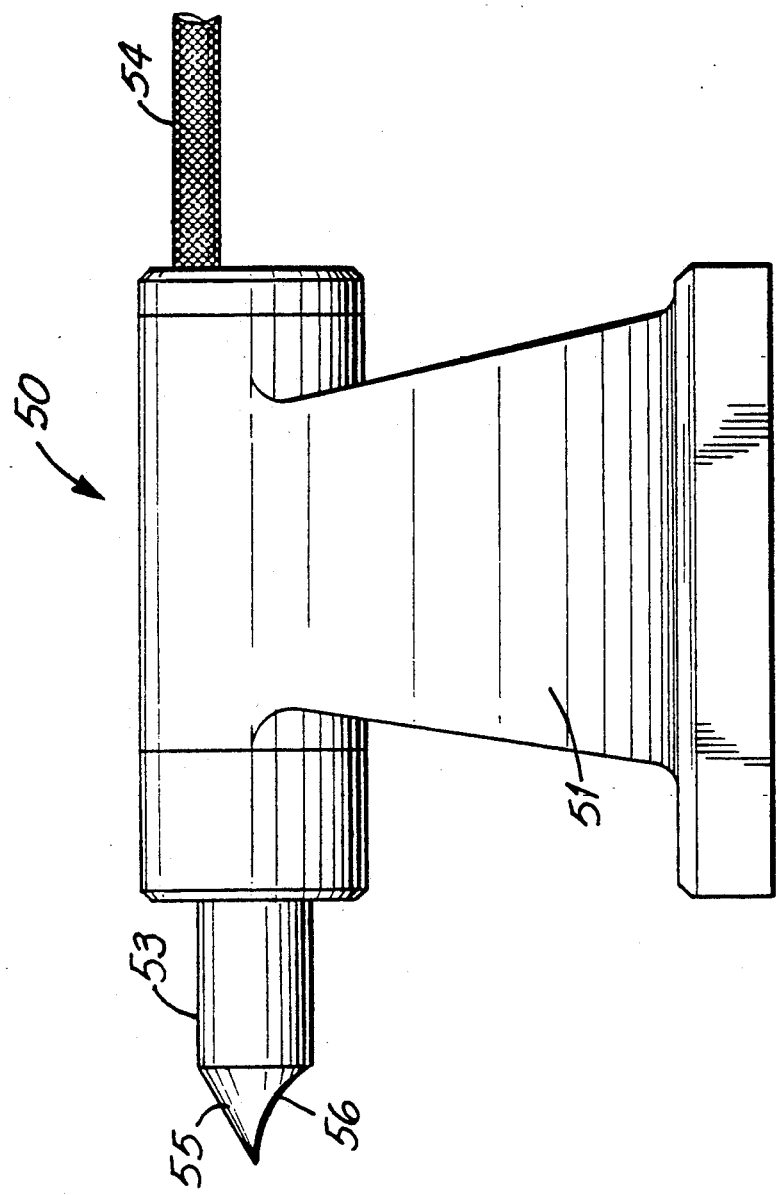
Figure 4A:
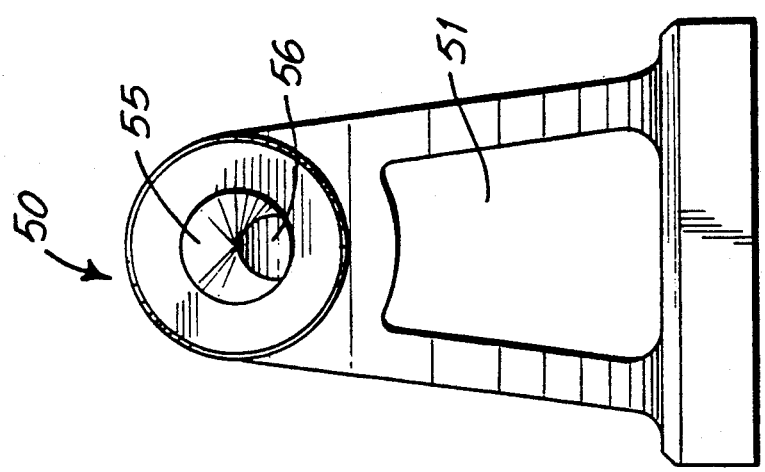

FIG. 2C an area of detail B of FIG. 2A illustrating a pattern which can be cut into the tube;

FIGS. 3A and 3B are detailed side and front views, respectively, of the rotary table apparatus; and, FIGS. 4A and 4B are detailed front and side views, respectively, of the distal tail apparatus.

DETAILED DESCRIPTION

Figure 1:
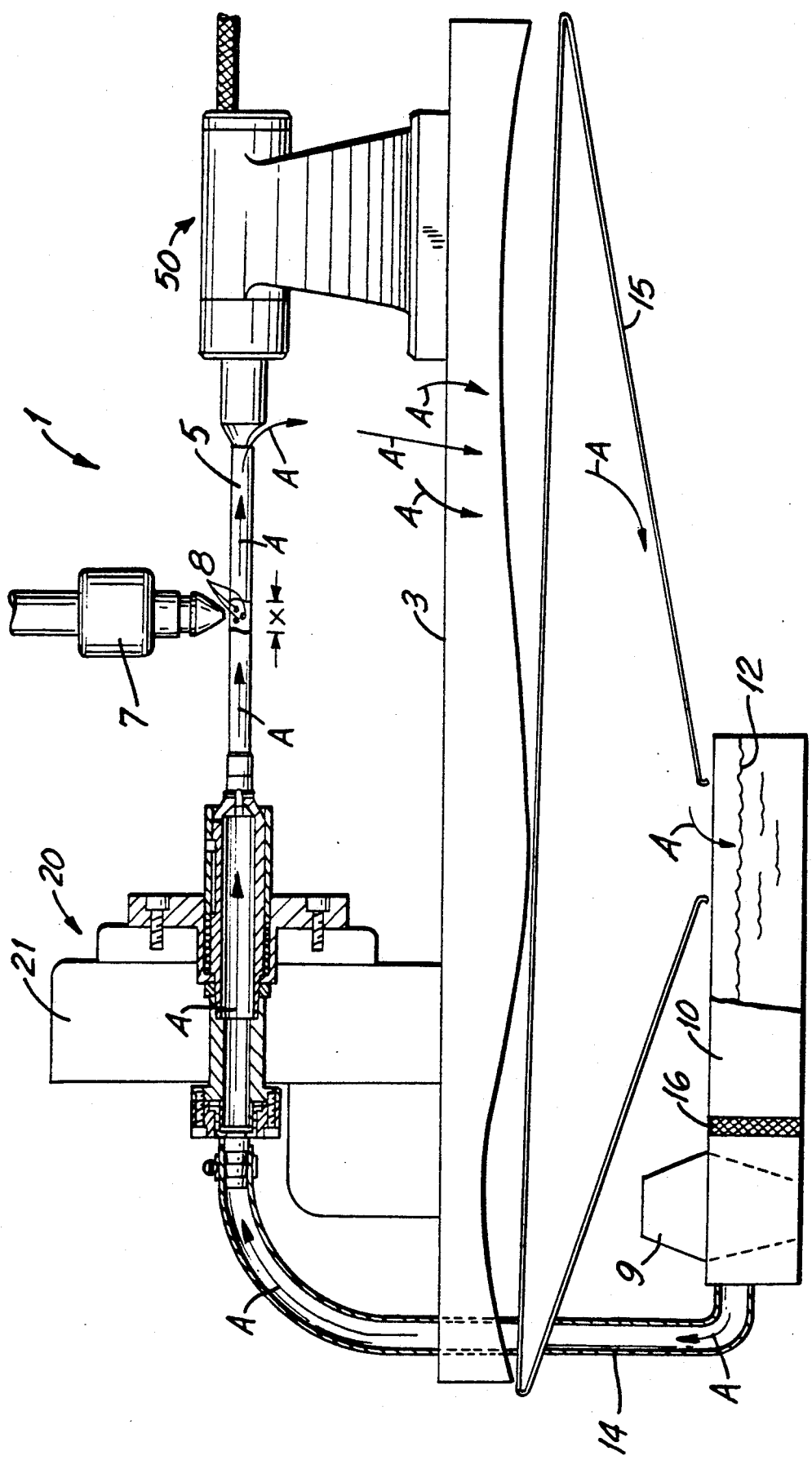
FIG. 1 is a side view of the laser cutting apparatus of the present invention.

FIG. 1 illustrates a laser cutting apparatus 1 according to one embodiment of the present invention. The laser cutting apparatus 1 includes a machine table 3, preferably of standard construction, to which are attached a rotary table apparatus 20 and a distal tail apparatus 50. A hollow workpiece is positioned longitudinally between the rotary table apparatus 20 and the distal tail apparatus 50 to be cut by a laser 7. A pump 9 and coolant tank 10 containing liquid coolant 12 are connected to the rotary table apparatus 20 by a conduit or hose 14, which is preferably made of plastic. A trough or tank 15 is positioned below the machine table 3 to direct coolant back to the coolant tank. A filter 16, preferably of mesh size five one-thousandths (0.005) of an inch or smaller, is positioned between the trough or tank 15 and the pump 9.

The embodiment of FIG. 1 also includes a microprocessor, not shown, to control the laser cutting and coolant flow operations. A computer numerical control (CNC) program is typically employed to control all aspects of the process. CNC programs are common and well known in the machine tool field, wherein an end user writes the program to direct the machine to perform the desired function. While it is preferred that the apparatus be microprocessor controlled, it should be understood that the laser cutting and coolant pumping operations can be manually initiated and performed.

The overall operation of the apparatus 1 will now be briefly described. A hollow workpiece 5, shown with a cutaway section "x" for illustrative purposes, is positioned by an operator between the rotary table apparatus 20 and the distal tail apparatus 50. The pattern to be cut into the workpiece 5 is predetermined and programmed into a microprocessor (not shown), which controls the laser 7 and the rotary table apparatus 20 during cutting. The microprocessor can, if desired, also control the operation of the distal tail apparatus 50 and the coolant flow operation of the pump 9.

Once the workpiece 5 is in place, liquid coolant is pumped through the apparatus 1 in the direction of the arrows "A". The coolant flows through rotary table apparatus 20 and the workpiece 5, contacting the inner circumference of the workpiece before exiting. Next, the laser 7 and workpiece 5 are maneuvered into the proper positions to initiate cutting. To cut the desired pattern, the laser 7 focuses a coherent light beam onto the surface of the workpiece 5, which heats the workpiece and causes molten stainless steel residue o dross 8 to drop into the workpiece, as shown in cutaway section "x" of FIG. 1. Particles of dross 8 are typically ten one-thousandths (0.010) of an inch or slightly smaller in size. The molten dross 8 solidifies upon contacting the flowing coolant and is flushed out the end of the workpiece 5 contacting the distal tail apparatus 50. The coolant and dross 8 exit the workpiece 5 onto the machine table 3, and then are collected by the trough or tank 15 and funneled into the coolant tank 10, where the filter 16 removes the dross before the coolant is recycled.

FIGS. 2A and 2B are side and cross sectional views, respectively, of a typical stainless steel workpiece 5 having a wall 1.3 millimeters(mm) or 0.05122 inches thick. The pattern 6 shown in FIG. 2A exemplifies the type of cut which can be made through one side of the tube 5 by a laser.

FIG. 2C depicts an area of detail "B" of FIG. 2A to further illustrate the pattern 6 to be cut into the tube 5. In this example, the desired pattern is only 0.3±0.05 mm or 0.01182±0.00197 inches wide, and is to be cut through one side of a stainless steel tube that is 1.3 mm thick. It is not possible to adequately machine cut such a precise pattern through one side of such a tube, so a laser must be used. One suitable metal cutting laser is an yttrium aluminum garnet (YAG) laser of the type built and sold by the Lumonics Corporation of Levonia, Mich. However, other types of commercially available lasers capable of cutting metal could also be used.

FIG. 3A is a detailed drawing of the rotary table apparatus 20 of FIG. 1. Rotary table apparatus 20 comprises a rotary table 21, a proximal center fixture 22, and a hose coupling fitting means 35. The rotary table 21 is anchored to the machine table 3 depicted in FIG. 1, and is operable to rotate a workpiece during laser cutting while permitting the coolant hose 14 to rotate independently.

The proximal center fixture 22 comprises a proximal center body 28 having a hollow chamber 32, and base plate 23 connected to the rotary table 21 by means of cap screws 24. Locking nuts 31 connect the proximal center body 28 to the base plate 23. A locating sleeve 25 and pressure spring 27 provide means to accept and retain a workpiece. The proximal center 29 along with sleeve ears 26 (shown in FIG. 3B) and locking pin 30 are designed to receive one end of a hollow workpiece. An opening 33 is at the end of the hollow chamber 32 closest to the proximal center 29. The preferred embodiment of the proximal center fixture 22 can accommodate workpieces having a diameter of from about 9 mm to about 18 mm, but could also be modified to accept larger or small diameter workpieces as will be readily apparent to those skilled in the art.

The hose coupling fitting means 35 comprises a freely rotatable body 36 having a hollow chamber 42, a hose coupling 37, and a locking plate 38 connected to the rotable body 36 by cap screws 39. A hose clamp 40 securely connects the hose 14 to the hose coupling 37. Hose coupling 37 and hose 14 preferably are capable of rotating about body 36 thus alleviating any tendency of the coolant to cause hose 14 to twist or kink. The hollow chamber 42 of the fitting means 35 opens into the hollow chamber 32 of the proximal center fixture 22.

FIG. 3B is a front view of the rotary table apparatus 20 depicting the rotary table 21, base plate 23, cap screws 24, sleeve ears 26, and opening 33.

FIG. 4A is a detailed front view, and FIG. 4B a detailed side view, of the distal tail apparatus 50 of FIG. 1. A hydraulic motor is located within the distal tail body 51, and is operable to move a cylinder head 53 in and out on command by actuation of a hydraulic hose 54. The cylinder head 53 is coneshaped at its tip, comprising a distal center 55 and a nose 56, to engage and support one end of a hollow workpiece. The distal tail body 51 is anchored to the machine table 3 so that the distal tail center 55 is aligned with the proximal center 29 of rotary table apparatus 20, as depicted in FIG. 1. Workpieces having a diameter of from about 9 mm to about 18 mm can be accommodated by the preferred embodiment of the cylinder head 53, but the cylinder head could be modified to accept larger or smaller diameter workpieces. Similarly, hollow workpieces of varying length can be handled by the present apparatus by positioning the distal tail apparatus 50 closer to, or farther from, the rotary table apparatus 20.

The overall operation of the method and apparatus of the present invention will now be described in detail using the stainless steel tube of FIG. 2A as an example. An operator positions the stainless steel tube between the rotary table apparatus 20 of FIG. 3A and the distal tail apparatus 50 of FIG. 4B. The hydraulic motor contained in distal tail body 51 is then operated to extend cylinder head 53 to contact one end of the tube, while the other end of the tube is positioned to contact the locating sleeve 25, sleeve ears 26 and proximal center 29 of the rotary table apparatus 20. The tube is held in place under light pressure, and sleeve ears 26 operate to locate the position of the tube so that the microprocessor can determine where cutting is to begin. The proximal center fixture 22 is microprocessor controlled to rotate the stainless steel tube into the correct positions during laser cutting.

Before cutting is initiated, coolant is pumped through hose 14 into the hollow chambers 42 and 32 of rotary table apparatus 20, and out opening 33. The coolant next enters one end of the tube 5, contacts the inner diameter wall, and exits the other end at the distal tail apparatus 50. The cylinder head 53 contains a nose 56 to direct the coolant downward where it will be collected by the trough 15, located under the machine table 3, and recycled. The hose coupling fitting means 35 is capable of rotating freely if the coolant hose 14 becomes twisted, thereby providing for a steady coolant flow.

The coolant used in the present invention is preferably a mixture of about ninety percent water and about ten percent synthetic oil, by volume, although mixtures in the range of from about 90 percent water and 10 percent oil to about 50 percent water and 50 percent oil can also be used. These mixtures aid the molten dross to solidify and also coat the metal parts of the apparatus to prevent corrosion. One suitable synthetic oil for use in the present apparatus is commercially available as "Trimsoil" brand oil.

A laser, capable of cutting through metal, is controlled by a microprocessor programmed to cut the pattern 6 shown in FIG. 2C. Referring to FIG. 1, the laser 7 is energized and begins cutting as coolant 12 continuously flows through and contacts the inner circumference of the tube workpiece 5, flushing away the solidified dross 8 particles. The flow rate of the coolant 12 through the tube is preferably at least about 3 gallons per minute to adequately flush out the dross 8 that forms during cutting. As cutting progresses some coolant may seep out of the tube where it has recently been cut, or may seep out of other holes which have been pre-cut into the tube. This seepage is inconsequential since coolant escaping in this manner will also be collected via trough or tank 15, filtered and recycled.

The apparatus and method of the present invention provide for the precision laser cutting of predetermined patterns into metal tubes while minimizing or eliminating adherence of the residue or dross to the inner circumference of the tube. This characteristic is highly desirable in applications where such dross adherence cannot be tolerated, such as the laser cutting of internal fixation devices.

The apparatus depicted in FIG. 1 is but one possible configuration of the present invention, and it should be understood that other configurations could be used without departing from the nature and scope of the invention. Further, although no attempt has been made to depict or describe the various power sources or safety equipment which should be used when employing a laser machine tool, one of ordinary skill in the art of laser machine tools would understand that such devices should be employed and would be able to construct an apparatus and use the method described to practice the present invention based on the disclosure made herein.

We claim:

1. A method for laser cutting a predetermined pattern through a wall of a hollow metal workpiece, comprising:
   pumping liquid coolant through a workpiece mounting means and the metal workpiece while cutting the pattern with a laser cutting means as the coolant flows through and contacts at least a portion of the inner surface of the workpiece, to flush out the dross that forms during cutting, such that adherence of the dross to the inner surface of the workpiece is minimized or eliminated.

2. The method of claim 1, wherein a microprocessor controls the laser cutting means, a workpiece rotation means, and a coolant pumping means.

3. The method of claim 2, wherein a computer numerical control program directs the operation of the laser cutting means, workpiece rotation means and coolant pumping means.

4. The method of claim 1, wherein the coolant that exits the workpiece is filtered to remove dross and is then recycled.

5. The method of claim 1, wherein the coolant flows through the workpiece at a minimum rate of about three gallons per minute.

6. The method of claim 1, wherein the coolant comprises a water to oil mixture in the range of from approximately 50 parts water and 50 parts oil to approximately 90 parts water and 10 parts oil, by volume.

7. An apparatus for laser cutting a pattern through a wall of a hollow metal workpiece, comprising:
   a laser means capable of cutting metal;
   a machine table;
   a rotary table means anchored to the machine table, wherein one end of the rotary table means includes a hose coupling means to accept a hose through which coolant is pumped and the other end includes proximal center fixture designed to accept one end of a hollow metal workpiece, the proximal center fixture being operable to rotate the workpiece during laser cutting;
   a distal tail center means anchored to the machine table at a distance from the rotary table means, wherein one end of the distal tail center means includes a cylinder head, which is aligned with the proximal center fixture, designed to accept the opposite end of the hollow metal workpiece;
   a pump and associated coolant tank to provide a continuous flow of liquid coolant through the rotary table means and the hollow metal workpiece; and
   a trough means for collecting and recycling liquid coolant exiting the hollow metal workpiece.

8. The apparatus of claim 7, wherein the proximal center fixture comprises a locating sleeve, sleeve ears, proximal center and a pressure spring to support and position the workpiece.

9. The apparatus of claim 7, wherein a hydraulic motor operates to move the cylinder head to contact one end of the workpiece, and to cause the other end of the workpiece to contact the proximal center fixture of the rotary table means.

10. The apparatus of claim 7, wherein the cylinder head has a cone shaped receiving end having a nose designed to direct the coolant in a downward direction.

11. The apparatus of claim 7, wherein the proximal center fixture and the cylinder head are designed to accept workpieces having a diameter of between approximately 9 mm and 18 mm.

12. The apparatus of claim 7, wherein the hose coupling means is capable of rotation independently of the proximal center fixture, to prevent constriction of the hose.

13. The apparatus of claim 7, wherein the coolant comprises a water to oil mixture in the range of from approximately 50 parts water and 50 parts oil to approximately 90 parts water and 10 parts oil, by volume.

14. The apparatus of claim 7, further comprising a coolant filter of mesh size 0.005 inches or smaller.

15. The apparatus of claim 7, further comprising a microprocessor.

16. The apparatus of claim 15, wherein the microprocessor operates under the control of a computer numerical program.

* * * * *

(12) REEXAMINATION CERTIFICATE (4683rd)
United States Patent
Tessier et al.

(10) Number: US 5,073,694 C1
(45) Certificate Issued: Dec. 17, 2002

(54) METHOD AND APPARATUS FOR LASER CUTTING A HOLLOW METAL WORKPIECE

(75) Inventors: Jeff M. Tessier, Monument, CO (US); Woodward G. Brown, Monument, CO (US)

(73) Assignee: Synthes (U.S.A.), Paoli, PA (US)

Reexamination Request:
No. 90/004,723, Aug. 11, 1997

Reexamination Certificate for:
Patent No.: 5,073,694
Issued: Dec. 17, 1991
Appl. No.: 07/658,551
Filed: Feb. 21, 1991

(51) Int. Cl.$^7$ .............................................. B23K 26/00
(52) U.S. Cl. .............................. 219/121.7; 219/121.71; 219/121.82; 219/121.84
(58) Field of Search ....................... 219/121.67, 121.72, 219/121.84, 121.7, 121.71

(56) References Cited

U.S. PATENT DOCUMENTS

| | | | | | |
|---|---|---|---|---|---|
| 4,001,543 A | * | 1/1977 | Bove et al. | ............ | 219/121.63 |
| 4,742,206 A | * | 5/1988 | Dietterich et al. | ..... | 219/121.67 |
| 4,931,615 A | * | 6/1990 | Muncy et al. | ......... | 219/121.67 |

FOREIGN PATENT DOCUMENTS

| | | | | | |
|---|---|---|---|---|---|
| DE | 3937460 | * | 11/1990 | ............ | 219/121.72 |
| JP | 52-85800 | * | 7/1977 | | |
| JP | 56-163090 | * | 12/1981 | ............ | 219/121.84 |
| JP | 59-82168 | * | 5/1984 | | |
| JP | 61-159291 | * | 7/1986 | ............ | 219/121.72 |
| JP | 61-245992 | * | 11/1986 | ............ | 219/121.84 |
| JP | 62-192283 | * | 8/1987 | ............ | 219/121.84 |
| JP | 62-267095 | * | 11/1987 | ............ | 219/121.72 |
| JP | 2-165885 | * | 6/1990 | | |
| JP | 2-192889 | * | 7/1990 | | |
| WO | WO 8903274 | | 4/1989 | | |

OTHER PUBLICATIONS

Miller to Freestone, Letter, Jun. 10, 1997 (Exh. G.).
Miller to Pegram, Letter, Dec. 26, 1997 (in Exh. I).
T. Calkins, Notebook p. 103 and attachment, Apr. 11, 1985 (in Exh. I).
Miller to Pegram, Letter, Jun. 10, 1998 (Exh. K).
Lumonics Lab Report, Lap No. 4203, Jan. 14, 1987 (Exh. L).
Lumonics Lab Report, Lab No. 4144, Nov. 6, 1987 (Exh. M).
Lumonics Lab Report, Lab. No. 4248, Feb. 16, 1988 (Exh. N).
S.A. Fitzer, Notebook p. 19, Jul. 12, 1988 (Exh. O).
S. Fitzer, Notebook p. 71, Oct. 6, 1988 (Exh. P).

* cited by examiner

*Primary Examiner*—Tom Dunn

(57) ABSTRACT

A method and apparatus for the laser cutting of hollow metal workpieces to minimize or eliminate residue or dross adherence to the inner circumference of the workpiece is disclosed. Coolant is pumped through the apparatus to contact the inner portion of the workpiece before and during laser cutting. The dross which forms during cutting drops into the coolant, solidifies and is flushed out of the workpiece along with the coolant. The coolant and dross are then collected by a trough, which funnels them to the coolant tank where the dross is removed by a filter and the coolant recycled. In a preferred embodiment, a microprocessor controls the laser cutting and coolant flow operations.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–7 and 9–16 are cancelled.

Claim 8 is determined to be patentable as amended.

8. [The] *An* apparatus [of claim 7] *for laser cutting a pattern through a wall of a hollow metal workpiece, comprising:*

*a laser means capable of cutting metal;*

*a machine table;*

*a rotary table means anchored to the machine table, wherein one end of the rotary table means includes a hose coupling means to accept a hose through which coolant is pumped and the other end includes proximal center fixture designed to accept one end of a hollow metal workpiece, the proximal center fixture being operable to rotate the workpiece during laser cutting,* wherein [the] *said* proximal center fixture comprises a locating sleeve, sleeve ears, proximal center and a pressure spring to support and position the workpiece*;*

*a distal tail center means anchored to the machine table at a distance from the rotary table means, wherein one end of the distal tail center means includes a cylinder head, which is aligned with the proximal center fixture, designed to accept the opposite end of the hollow metal workpiece;*

*a pump and associated coolant tank to provide a continuous flow of liquid coolant through the rotary table means and the hollow metal workpiece; and*

*a trough means for collecting and recycling liquid coolant exiting the hollow metal workpiece.*

* * * * *